(12) United States Patent
Corsini et al.

(10) Patent No.: US 11,789,713 B2
(45) Date of Patent: Oct. 17, 2023

(54) METHOD AND SYSTEM FOR DETERMINING IN WHICH TECHNOLOGICAL LAYER A MODULE OF A MOM APPLICATION IS TO BE DEPLOYED

(71) Applicant: Siemens Aktiengesellschaft, Munich (DE)

(72) Inventors: Giorgio Corsini, Genoa (IT); Andrea Loleo, Genoa (IT); Ernesto Montaldo, Genoa (IT); Giovanni Venturi, Genoa (IT)

(73) Assignee: Siemens Aktiengesellschaft, Munich (DE)

( * ) Notice: Subject to any disclaimer, the term of this patent is extended or adjusted under 35 U.S.C. 154(b) by 35 days.

(21) Appl. No.: 17/530,705

(22) Filed: Nov. 19, 2021

(65) Prior Publication Data

US 2022/0156051 A1    May 19, 2022

(30) Foreign Application Priority Data

Nov. 19, 2020  (EP) .................................. 20208681

(51) Int. Cl.
*G06F 8/60*        (2018.01)

(52) U.S. Cl.
CPC ...................... *G06F 8/60* (2013.01)

(58) Field of Classification Search
CPC ........................................................ G06F 8/60
See application file for complete search history.

(56) References Cited

U.S. PATENT DOCUMENTS 8,225,272 B2 *  7/2012  Feldman ............... G06F 8/60
                                              709/201
9,858,060 B2 *  1/2018  Barros ............... G06F 9/45558
(Continued)

FOREIGN PATENT DOCUMENTS

CN    103595061 A  *  2/2014
CN    108255497 A  *  7/2018 ............... G06F 8/60
(Continued)

OTHER PUBLICATIONS

Wang et al., "Acollaborative manufacturing execution system oriented to discrete manufacturing enterprises", 2016, Concurrent Engineering (Year: 2016).*
(Continued)

*Primary Examiner* — Wei Y Zhen
*Assistant Examiner* — Junchun Wu
(74) *Attorney, Agent, or Firm* — Laurence A. Greenberg; Werner H. Stemer; Ralph E. Locher

(57) ABSTRACT

A method and a system determine a technological layer in which a module of a Manufacturing Operations Management (MOM) application is to be deployed. The specific MOM application has two or more modules that are separately deployable in at least two technological layers. For the specific MOM application, a set of characteristic parameters is defined that characterize business, process and information technology characteristics of the specific MOM application relevant for technological layer computation purposes. For each given module, there is defined a layer-deploying function, having as input a subset of the characteristic parameters and having as output a range value determining the technological layer to deploy the module at configuration time. For at least one of the given modules, there is determined the corresponding deploying technologi- (Continued)

cal layer by applying its corresponding layer-deploying function.

10 Claims, 1 Drawing Sheet

(56) References Cited

U.S. PATENT DOCUMENTS

| | | | | |
|---|---|---|---|---|
| 10,162,827 | B2* | 12/2018 | Sreenivasamurthy | G06F 8/65 |
| 10,324,696 | B2* | 6/2019 | Bhat | G06F 8/60 |
| 11,288,175 | B1* | 3/2022 | Balmakhtar | G06F 8/60 |
| 2007/0283344 | A1* | 12/2007 | Apte | G06F 9/44526 |
| | | | | 717/174 |
| 2017/0366586 | A1* | 12/2017 | Bloesch | G06F 8/60 |
| 2018/0210716 | A1* | 7/2018 | Bardini | G06Q 50/04 |
| 2018/0260200 | A1* | 9/2018 | Karagiannis | H04L 41/5041 |
| 2018/0307213 | A1* | 10/2018 | Bordello | G05B 19/4188 |
| 2019/0227503 | A1* | 7/2019 | Corsini | G06F 16/258 |
| 2022/0058582 | A1* | 2/2022 | Greer | G06F 8/61 |
| 2022/0100486 | A1* | 3/2022 | Yang | G06F 18/217 |
| 2022/0114524 | A1* | 4/2022 | Montaldo | G06Q 10/067 |
| 2023/0113393 | A1* | 4/2023 | Mathews | G06F 8/60 |
| | | | | 717/105 |

FOREIGN PATENT DOCUMENTS

| | | | | |
|---|---|---|---|---|
| CN | 109507979 A | * | 3/2019 | |
| CN | 110658794 A | * | 1/2020 | |
| EP | 3690765 A1 | * | 8/2020 | G06Q 10/00 |
| EP | 3690765 A1 | | 8/2020 | |

OTHER PUBLICATIONS

Scheer et al., "ARIS Architecture and Reference Models for Business Process Management", 2000, Springer-Verlag Berlin Heidelberg (Year: 2000).*

Tao et al., "Cloud manufacturing: a computing and service-oriented manufacturing model", Mar. 2011, Proc. IMechE (Year: 2011).*

Huang et al., "Cloud manufacturing service platform for small- and medium-sized enterprises", Jun. 2012, Springer-Verlag London (Year: 2012).*

Meyer-Hentschel et al., "Manufacturing Operations Management for Smart Manufacturing—A Case Study", Aug. 2020, HAL (Year: 2020).*

Du et al., "Manufacturing Resource Optimization Deployment for Manufacturing Execution System", 2008, IEEE (Year: 2008).*

* cited by examiner

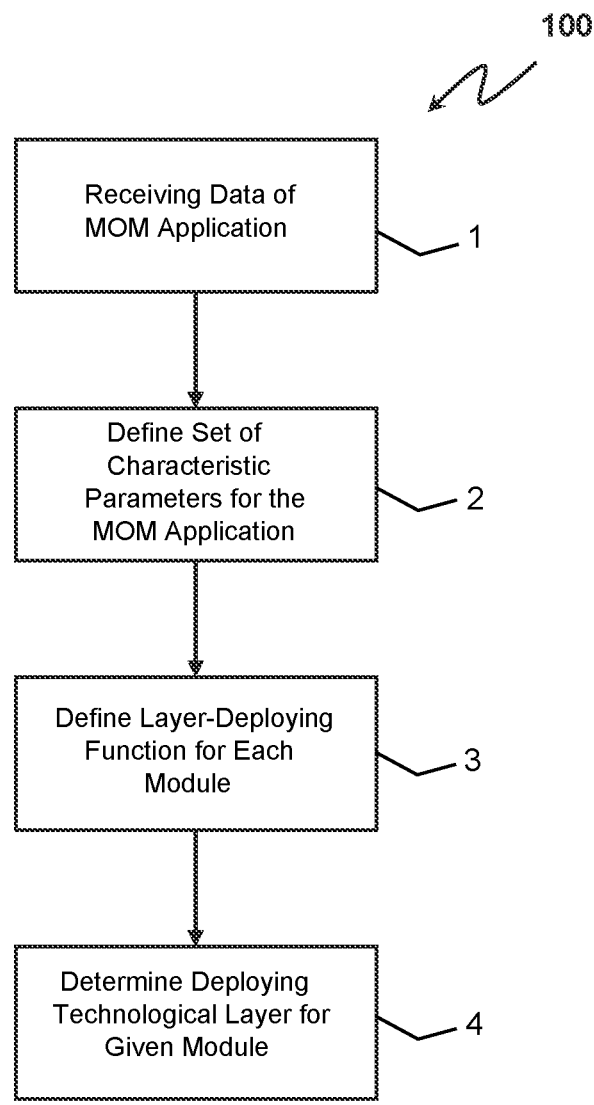

METHOD AND SYSTEM FOR DETERMINING IN WHICH TECHNOLOGICAL LAYER A MODULE OF A MOM APPLICATION IS TO BE DEPLOYED

CROSS-REFERENCE TO RELATED APPLICATION

This application claims the priority, under 35 U.S.C. § 119, of European Patent Application EP 20208681.5, filed Nov. 19, 2020; the prior application is herewith incorporated by reference in its entirety.

FIELD AND BACKGROUND OF THE INVENTION

The invention relates to a method and a system for determining in which technological layer a module of a MOM application is to be deployed.

Most recently, the term MOM (Manufacturing Operations Management) is more and more used to replace the term MES (Manufacturing Execution System). MES/MOM applications and systems can usually comprise software used as component or step as component, as explained in the following.

As defined by the Manufacturing Enterprise Solutions Association (MESA International), a MES/MOM system "is a dynamic information system that drives effective execution of manufacturing operations," by managing "production operations from point of order release into manufacturing to point of product delivery into finished goods" and by providing "mission critical information about production activities to others across the organization and supply chain via bi-directional communication."

The functions that MES/MOM systems usually include, in order to improve quality and process performance of manufacturing plants, resource allocation and status, dispatching production orders, data collection/acquisition, quality management, maintenance management, performance analysis, operations/detail scheduling, document control, labor management, process management and product tracking.

In general, a MOM system is defined as an information system that connects, monitors and controls complex manufacturing production processes and data flows within an enterprise. The main goal of a MOM system is to ensure the effective execution of the manufacturing operations and to improve the production output.

Traditionally, a MOM system has always been designed as a monolithic, single-plant and central-based applications where a central module embraces all the decision capabilities.

Recent industrial trends, however, such as for example the globalization of customers and competitors, Industry 4.0 initiatives are steering for a new generation of MOM systems that are able to follow the new production process paradigms.

Most importantly, Industry 4.0 has created the idea of "smart factory" where one of the main design principles is the distribution of components that are capable to interact with each other and that are also capable to perform their tasks as autonomously as possible based on local decision-making criteria.

This new view drives toward a wider geographic distribution of production sites.

Traditional MOM systems are not able to cope with such a distributed environment where the manufacturing production processes are now described as a set of decomposed functionalities that are hierarchically distributed across the geographic distributed enterprise.

To face these new requirements, a modern MOM system should provide its own capabilities as a set of distributed, self-descriptive and autonomous functionalities that are able to cooperate at different enterprise levels.

Therefore, one of the emerging issues for manufacturing companies is to optimize the deployment of MOM modules and functionalities not only from a geographical distribution perspective but also from a technological layer perspective.

Our commonly assigned European published patent application EP3690765 discloses a technique for deploying a MOM module across a plurality of layers in a dynamic way based on a set of changing production indicators whereby module can be dynamically deployment upon changes in manufacturing patterns.

In the art, the optimal distribution at configuration time of the required MOM modules and functions is still identified by using best practices, the domain industry knowledge and/or the recommendations provided by software products documentation.

This approach is still valid for "classic" software platforms/products, where the level of freedom in the setup phase is very limited, due to poor modularization and limiting hardware requirements.

The technical problem of determining where the different modules of an identified MOM solution should be deployed at configuration time, among different technological layers, has so far been solved manually or by starting from the knowledge base of the MOM expert sales and/or delivery teams.

Current techniques for identifying the optimal deployment distribution of modules of MOM module at configuration level are cumbersome, tedious, error-prone, and otherwise ill-suited for the task.

SUMMARY OF THE INVENTION

It is accordingly an object of the invention to provide a method and a system which overcomes the above-mentioned disadvantages and drawbacks of the heretofore-known devices and methods of this general type and which provides for a method and system for determining in which technological layer modules of a MOM application are to be optimally deployable at configuration time.

With the above and other objects in view there is provided, in accordance with the invention, a method and a system for determining in which technological layer a module of a MOM application is to be deployed. The method comprises the following:
 a) receiving data of a specific MOM application comprising at least two modules, wherein each module is independently deployable in at least two layers of a plurality of technological layers;
 b) for the specific MOM application, defining a set of characteristics parameters characterizing business, process and information technology characteristics of the specific MOM application relevant for technological layer computation purposes;
 c) for each given module, defining a layer-deploying function, having as input a subset of the characteristic parameters and having as output a range value determining the technological layer to deploy the module at configuration time;

d) for at least one of the given modules, determining its corresponding deploying technological layer by applying its corresponding layer-deploying function.

In accordance with the invention, the at least two modules of the MOM application may be selected from the group consisting of order management modules; production order scheduling modules; quality management module; track and trace modules; and, non-conformance management modules.

The technological layer may conveniently be selected from the group consisting of cloud layers; premise layers; and hedge layers.

In a further embodiment of the invention, upon selection, at configuration time the given module may be deployed to the determined technological layer.

In invention embodiments, the layer-deploying function may preferably optimize performance parameters such a cost parameters; production quality parameters; production speed parameters; environmental impact parameters; and/or energy consumption parameters.

Furthermore, with the above and other objects in view there is also provided, in accordance with the invention, a computer program element, comprising computer program code for performing steps according to the above-mentioned method when loaded in a digital processor of a computing device.

Additionally, a computer program product stored on a computer-readable medium can be provided, comprising non-transitory computer readable program code for causing a computing device to perform the mentioned method.

Embodiments enable to automatically distribute the modules of a MOM application at configuration time by determining the technological layers for optimized deployment based on the specific customer project characteristics.

Embodiments enable customers benefits by providing an efficient mechanism capable of optimizing the resources utilization, reducing production time and/or improving the manufacturing plant utilization.

Embodiments enable to configure software solutions designed and tailored to a specific project of a specific customer.

Embodiments enable to create a recommended deployment strategy for the whole MOM solution.

Embodiments enable to optimally distribute MOM functionalities at configuration time.

Embodiments enable to optimize the distribution of MOM functionalities according to the new requirements given by new industrial trends like globalization of customers and competitors and the new initiatives such as the Industry 4.0.

Embodiments enable determining the optimal distribution of MOM modules in accordance with three main categories of variability factors, which are business factors, process factors and IT factors.

Embodiments enable obtaining a distribution schema for a MOM solution, based on a set of end user's solution characteristics (business, process, IT), allowing to deploy the selected MOM modules on the most appropriate technological layer (On Premises, On Edge, On Cloud).

Other features which are considered as characteristic for the invention are set forth in the appended claims.

Although the invention is illustrated and described herein as embodied in a method of determining in which technological layer a module of a MOM application is to be deployed, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE FIGURE

The sole figure of the drawing illustrates a flowchart for determining in which technological layer a module of a MOM application is to be deployed in accordance with disclosed embodiments.

DETAILED DESCRIPTION OF THE INVENTION

At least some embodiments of the present invention address the above described issue in which a technological layer is determined where a module of a MOM application is to be deployed. The process is illustrated in a flowchart 100 of the figure.

At step 1, data of a specific MOM application are received, such MOM application comprising at least two modules wherein each module is independently deployable in at least two layers of a plurality of technological layers. In embodiments, received data of a specific MOM application include any relevant received information data on the MOM application obtained without accessing the MOM application or any relevant data obtainable by accessing the MOM application.

At step 2, for the specific MOM application, a set of characteristic parameters are defined, such parameters are characterizing business, process and information technology characteristics of the specific MOM application relevant for technological layer computation purposes.

At step 3, for each given module, a layer-deploying function is defined; such function has as input a subset of the characteristic parameters and having as output a range value determining the technological layer to deploy the given module at configuration time.

At step 4, for at least one of the given modules, its corresponding deploying technological layer is determined by applying its corresponding layer-deploying function.

In an embodiment of the invention, an optimized distribution schema for a MOM solution is obtained, based on a set of end user's solution characteristics (business, process, IT), allowing to deploy the selected MOM modules on the most appropriate technological layer, such as, for example, on premise layer, on edge layer, on layer.

In an embodiment, a set of MOM functionalities, implementable as modules of the MOM application, may conveniently be defined from the solutions resulting from the outcome of a customer analysis performed for example via a customer assessment tool.

An example of a customer assessment tool is an artifact of Siemens Industry Software called Big Block Diagram wherein a set of solution templates are selected during a customer analysis. These solution templates describe the MOM functionalities and are associated to elements or modules of the software product portfolio.

In a further embodiment, a set of characteristic parameters of the MOM application may be defined as resulting parameters of an outcome of a customer assessment process.

Characteristic parameters, or characteristics parameters, define characteristics of a specific customer project.

It will be understood that in the art there is a large choice of variability points due to the possible products, engineering and manufacturing processes, across industries, across customers and very often even for a given customer. In certain embodiments, characteristic parameters relating to these variability points are identified and analyzed in accordance with their impact on the MOM solution. Advantageously, the identification of the characteristics allows to validate such variabilities and to fit the solution to the real customer domain.

Embodiments include defining three types of characteristic parameters, namely: business landscape characteristics, process landscape characteristics, and information technology ("IT") landscape characteristics.

Examples of business characteristic parameters include, but are not limited to:
 company size, e.g. micro, small, medium, large;
 enterprise role, e.g. OEM, contract manufacturer, Tier 1, Tier2, Tier3, part manufacturer;
 product development lifecycle, e.g. short, moderate, long, very long;
 product variability e.g. high, medium, low;
 level of regulatory compliance, e.g. high, medium, low;
 production volume, e.g. small, medium, large, mass production;
 changes frequency, number of product or process changes which impact the manufacturing process.

Examples of process characteristic parameters include, but are not limited to:
 amount of production sites;
 amount of production lines;
 frequency of change, e.g. high, medium, low;
 automation level, e.g. no automation, automated data-acquisition, automated Human Machine Interface ("HMI"), fully automated factory, etc.
 process type, e.g. Engineering to Order ("ETO"), Make to Stock ("MTS"), Configure to Order ("CTO"), etc.
 production method, e.g. Job Shop, Batch, Mass or Flow Production, etc.
 process complexity, e.g. number of assembly steps;
 change management process in place.

Examples of IT characteristic parameters include, but are not limited to:
 cloud platform already used, e.g. Yes/No;
 product Lifecycle Management ("PLM") platform, e.g. Yes/No;
 Enterprise Resource Planning ("ERP") platform e.g. Yes/No;
 operating Systems: Windows, Linux, etc.
 network types (Ethernet, wireless LAN, ADSL, cable modem).

Embodiments enable defining a function in form of a deployment matrix for the MOM modules of the identified solution in order to determine, for each MOM module, in which technological layer is to be deployed by applying values of relevant characteristic parameters.

Examples of performance parameter which a layer-deploying function may optimize include, but are not limited by, cost parameters; production quality parameters; production speed parameters; environmental impact parameters; and energy consumption.

Simple Exemplary Embodiment

In an exemplary embodiment, assume that each set of characteristic parameters, business, process, IT, comprises a finite number of parameters, respectively $N_B$, $N_P$, $N_{IT}$, as exemplified with the notation below.

| | |
|---|---|
| $N_B$ business characteristic parameters | $C^B_i$, where i = 1, ..., $N_B$ |
| $N_P$ process characteristic parameters | $C^P_j$, where j = 1, ..., $N_P$ |
| $N_{IT}$ IT characteristic parameters | $C^{IT}_k$, where k = 1, ..., $N_{IT}$ |

Assume that each characteristic parameter C has a finite set of n possible values $V(v_1, v_2, v_3, \ldots, v_n)$.

Denote as $N_{TD}$ the number of levels of available technological deployments $TD_t$ where t=1, ..., $N_{TD}$.

Denote as $N_{MM}$ the number of MOM modules identified for a given solution $MM_m$ where m=1, ..., $N_{MM}$.

In an embodiment, for each MOM module $MM_m$ and for each possible values of the characteristics $C^B_i$, $C^P_j$, $C^{IT}_k$ is associated a preferred technological deployment later $TD_t$.

In an embodiment, for each given MOM module $MM_m$, a subset of $S_B$, $S_P$, $S_{IT}$ parameters of the $N_B$, $N_P$, $N_{IT}$ respective characteristic parameters is taken into consideration for calculation purposes.

In an embodiment, it is considered the subset having an impact on the layer deploying function of the given module $MM_m$.

In an embodiment, the layer deploying function is an average function or a weighted average function. In other embodiments, the layer deployment function may be another type of function, for example a non-linear function, a statistical function or a function trained with a machine learning algorithm. In a given embodiment, the type of layer deploying function depends on the customer project characteristics.

By applying the layer deploying function, the optimized technological deployment layer $TD_t$ where the MOM module $MM_m$ is to be deployed is determined.

Assume a simplified exemplary embodiment where there are two MOM modules $MM_1$ and $MM_2$, which are, respectively an Order Management Module and a Production Scheduling Module.

Assume that in this simplified example embodiment there are three available levels of technological deployment, on "Cloud", on "Premises", on "Edge" respectively $TD_1$, $TD_2$, $TD_3$ with a respective range value of circa 1, 2, 3.

In an embodiment, MOM modules whose MOM functionality require fast computations and results close to the field, the determined deploying technological layer by applying the layer deploying function is the edge, also known as field layer, while when high level computations are required, the determined technological deployment layer by applying the layer deploying function is the cloud.

In an embodiment, a layer deploying function is defined departing from inputs of values associated to the characteristic parameters.

In an embodiment, for each given MOM module MMm, each of the characteristic parameters of the subsets $C^B_i$, $C^P_j$, $C^{IT}_k$ are associated a corresponding defined numerical value.

Those of skill in the pertinent art will easily understand that characteristic parameter values are defined and assigned according to a knowledge base of the industry and according to the specific manufacturing project of a given customer.

In an exemplary embodiment, the knowledge may conveniently be gathered via the Big Block Diagram artifact.

Assume as example that the manufacturing project is an automotive project where macro blocks of the project include different macro area types like e.g. chassis printing areas, part painting areas, assembly areas. In every different area type of this example, there are specific MOM functionalities and every area has different characteristic parameters, for example in the assembly area process may be complex and fast and in the painting area process may be simple and slow.

In an embodiment of the invention, a MOM functionality according to the specific customer project and its macro area is deployed in its optimal technological layer.

Table 1 shows an example of a matrix for the layer deploying function for the MOM module, Order Management Module $MM_1$.

Table 2 shows an example of layer deployment matrix for the Production Order Scheduling Module $MM_2$.

TABLE 1 layer deployment matrix for the Order Management Module $MM_1$

| Characteristics $C^B_i, C^P_j, C^{IT}_k$ | Associated Values $V (v_1, v_2, v_3, \ldots, v_n)$ | selected parameter value V |
|---|---|---|
| $C^B_1$ – product variability | $C^B_1$ = (high, medium, low) $V$ = (1, 2, 3) | 1 |
| $C^P_1$ = amount of production sites | $C^P_1$ = (1, 2, >2) $V$ = (2, 1, 1) | 1 |
| $C^P_2$ – process type | $C^P_2$ = (ETO, MTS, CTO) $V$ = (2, 1, 1) | 2 |
| $C^{IT}_1$ – ERP platform | $C^{IT}_1$ = (Yes, No) $V$ = (1, 2) | 1 |
| $C^{IT}_2$ – PLM platform | $C^{IT}_1$ = (Yes, No) $V$ = (2, 1) | 1 |
| Technology Deployment function result: $TD_1, TD_2, TD_3$ (e.g., arithmetic mean) | | 1.2~1 |

TABLE 2 layer deployment matrix for the Production Order Scheduling Module $MM_2$

| Characteristics $C^B_i, C^P_j, C^{IT}_k$ | Associated Values $V (v_1, v_2, v_3, \ldots, v_n)$ | selected parameter value V |
|---|---|---|
| $C^B_1$ – product variability | $C^{B1}$ = (high, medium, low) $V$ = (1, 2, 3) | 1 |
| $C^B_2$ – product volume | $C^B_2$ = (high, medium, low) $V$ = (1, 2, 2) | 2 |
| $C^P_1$ – process type | $C^P_2$ = (ETO, MTS, CTO) $V$ = (2, 1, 1) | 2 |
| $C^{IT}_1$ – ERP platform | $C^{IT}_1$ = (Yes, No) $V$ = (1, 2) | 2 |
| Technology Deployment function result: $TD_1, TD_2, TD_3$ (e.g., arithmetic mean) | | 1.75~2 |

Referring to Table 1, for the Order Management Module $MM_1$, in the last two columns it is shown an exemplary layer deploying matrix, where the input are business characteristics, i.e. product variability values (high, medium, low), process characteristics, i.e. amount of production sites (one, two, more than two) and process type (ETO, MTS, CTO) and IT characteristics, i.e. ERP platform (yes, now), PLM platform (yes, now) and where the corresponding output values are shown $V(v_1,v_2,v_3, \ldots, v_n)$. For example, assume that for the specific customer project the input characteristic parameters are high product variability, ETO process type, ERP platform and PLM platform, then, by applying the layer deploying function, the final value is 1.2 which is the arithmetic mean of the values (1,1,2,1,1) obtained in the third column.

For this example, the determined technological layer of this Order Management Module is therefore the Cloud.

Referring to Table 2, for the Production Order Scheduling Module $MM_2$, in the last two columns it is shown an exemplary layer deploying matrix, where the input are business characteristics, i.e. product variability values (high, medium, low), product volume (high, medium, low), process characteristics, i.e. process type (ETO, MTS, CTO) and IT characteristics, i.e. ERP platform (yes, now) and where the corresponding output values are shown $V(v_1,v_2, v_3, \ldots, v_n)$. For example, assume that for the specific customer project the input characteristic parameters are high product variability, low product volume, ETO process type and ERP platform, then, by applying the layer deploying function, the final value is 1.75 which is the arithmetic mean of the values (1,2,2,2).

For this example, the determined technological layer of this Production Order Scheduling Module is therefore the Premise.

For example, as shown in the exemplary embodiment of the below tables 1 and 2, for the Order Management Module $MM_1$ and for the Production Order Scheduling Module $MM_2$, a high product variability is associated with a value "1" and a low product variability is associated with a value "3", an ETO process type is associated with a value "2" and CTO, MTS are associated with a value "1".

In an embodiment, the input characteristics determine on which technological layer to distribute a specific MOM functionality.

In an embodiment, a MOM module corresponds to a MOM functionality, preferably in forms of macro functions as for example scheduling, order management, material management etc.

The optimal technological layer to be deployed for a given MOM module preferably depends also on the type of production operation and which is the area of the plant. In embodiments, a different area of the plant may imply a different layer deployment for a MOM module. For example, painting operation with three different colors has a lower variability than an assembly line where there are a lot of configurations to be satisfied.

In a given embodiment, a scheduling module, differently than an order management module, may not need a PLM platform.

In certain embodiments, with an ETO process type, for every production order there is a different engineering, e.g. optional for a car, therefore a deployment at the hedge is preferred, while for the production of smartphones (MTS), where there are no options, a deployment at a same higher level may be a better solution.

The invention claimed is:

1. A method for determining in which technological layer a module of a Manufacturing Operations Management (MOM) application is to be deployed and for deploying the module as part of an optimized distribution, the method comprising the following steps:
   a) receiving data of a specific MOM application having a plurality of modules, wherein each of the plurality of modules is independently deployable in at least two layers of a plurality of technological layers;
   b) for the specific MOM application, defining a set of characteristic parameters characterizing business characteristics, process characteristics and information technology characteristics of the specific MOM application relevant for technological layer computation purposes;

c) for a given module, which is one of the plurality of modules, defining a corresponding layer-deploying function, the corresponding layer-deploying function having as input a subset of the characteristic parameters and having as output a range value determining the technological layer to deploy the given module at configuration time;

d) for the given module, determining a corresponding deploying technological layer in which the given module will be deployed by applying the corresponding layer-deploying function defined for the given module; and e) following step d), deploying, at configuration time, the given module to the technological layer determined in step d);

wherein deploying the given module to the technological layer determined in step d) is at least part of an optimized distribution of the plurality of modules of the specific MOM application.

2. The method according to claim 1, wherein each of the at least two modules of the MOM application is a module selected from the group consisting of:
an order management module;
a production order scheduling module;
a quality management module;
a track and trace module; and
a non-conformance management module.

3. The method according to claim 1, wherein the technological layer is a layer selected from the group consisting of:
a cloud layer;
a premise layer; and
a hedge layer.

4. The method according to claim 1, wherein the layer-deploying function is configured to optimize performance parameters selected from the group consisting of:
cost parameters;
production quality parameters;
production speed parameters;
environmental impact parameters; and
energy consumption parameters.

5. A non-transitory computer-readable medium comprising a computer program product having non-transitory computer code stored thereon, the computer code configured for, when loaded into a computer, performing steps of the method according to claim 1.

6. A system for determining in which technological layer a module of a Manufacturing Operations Management (MOM) application is to be deployed, the system comprising:

a digital processor programmed for performing:

a) receiving data of a specific MOM application having a plurality of modules, wherein each of the plurality of modules is independently deployable in at least two layers of a plurality of technological layers;

b) for the specific MOM application, defining a set of characteristic parameters characterizing business characteristics, process characteristics and information technology characteristics of the specific MOM application relevant for technological layer computation purposes;

c) for a given module, which is one of the plurality of modules, defining a corresponding layer-deploying function, the corresponding layer-deploying function having as input a subset of the characteristic parameters and having as output a range value determining the technological layer to deploy the given module at configuration time;

d) for the given module, determining a corresponding deploying technological layer in which the given module will be deployed by applying the corresponding layer-deploying function defined for the given module; and e) following step d), deploying, at configuration time, the given module to the technological layer determined in step d);

wherein deploying the given module to the technological layer determined in step d) is at least part of an optimized distribution of the plurality of modules of the specific MOM application.

7. The system according to claim 6, wherein each of the at least two modules of the MOM application is selected from the group of modules consisting of:
an order management module;
a production order scheduling module;
a quality management module;
a track and trace module; and
a non-conformance management module.

8. The system according to claim 6, wherein the technological layer is a layer selected from the group consisting of:
a cloud layer;
a premise layer; and
a hedge layer.

9. The system according to claim 6, wherein step e) is performed upon selection.

10. The system according to claim 6, wherein the layer-deploying function is defined to optimize performance parameters selected from the group of parameters consisting of:
cost parameters;
production quality parameters;
production speed parameters;
environmental impact parameters; and
energy consumption parameters.

* * * * *